United States Patent [19]
Croslin

[11] Patent Number: 5,883,881
[45] Date of Patent: Mar. 16, 1999

[54] METHOD FOR SELECTING PREFERRED NODES FOR DISTRIBUTED NETWORK RESTORATION

[75] Inventor: William D. Croslin, Colorado Springs, Colo.

[73] Assignee: MCI Communications Corporation, Del.

[21] Appl. No.: 777,416

[22] Filed: Dec. 30, 1996

[51] Int. Cl.$^6$ ........................................... H04L 1/22
[52] U.S. Cl. ........................................... 370/221; 370/400
[58] Field of Search ................................. 370/216, 225, 370/228, 235, 237, 238, 252, 221, 248, 400; 395/182.01, 182.02

[56] References Cited

U.S. PATENT DOCUMENTS

| | | |
|---|---|---|
| 4,577,066 | 3/1986 | Bimonte et al. . |
| 4,920,529 | 4/1990 | Sasaki et al. . |
| 5,058,105 | 10/1991 | Mansour et al. ......................... 370/238 |
| 5,187,740 | 2/1993 | Swaim et al. ............................ 379/209 |
| 5,335,268 | 8/1994 | Kelly, Jr. et al. ....................... 379/112 |
| 5,459,716 | 10/1995 | Fahim et al. ............................. 370/16 |
| 5,463,615 | 10/1995 | Steinhorn . |
| 5,636,203 | 6/1997 | Shah ....................................... 370/244 |
| 5,646,936 | 7/1997 | Shah et al. .............................. 370/228 |
| 5,706,276 | 1/1998 | Arslan et al. ............................ 370/238 |

FOREIGN PATENT DOCUMENTS

| | | |
|---|---|---|
| 0 494 513 A2 | 12/1991 | European Pat. Off. . |
| WO 95/10149 | 4/1995 | WIPO . |

OTHER PUBLICATIONS

Manione et al. "An Inconsistencies Tolerant Approach in the Fault Diagnosis of Telecommunications Networks" Feb. 14, 1994.

Bouloutas, et al. "Alarm Correlation and Fault Identification in Communication Networks" Feb. 1, 1994.

Herzberg et al. "The Hop–Limit Approach for Spare–Capacity Assignment in Survivable Networks" IEEE Dec. 3, 1995.

Dighe, et al. "A Link Based Alternative Routing Scheme for Network Restoration under Failure" IEEE May 1995.

Grover et al. "Near Optimal Spare Capacity Planning in a Mesh Restorable Network" IEEE Jan. 1991.

Hasegawa et al. "Dynamic Reconfiguration of Digital Cross– Connect Systems with Network Control and Management" IEEE.

Bellary, et al. "Intelligent Transport Network Survivability: Study of Distributed and Centralized Control Techniques" IEEE 1990.

Shimazaki et al. "Neopilot: An Integrated ISDN Fault Management System" IEEE Feb. 1990.

Shimazaki et al. "Network Fault Management" Sep. 1992.

Newport, et al. "Network Survivability Through Connectivity Optimization" IEEE 1987.

(List continued on next page.)

*Primary Examiner*—Min Jung

[57] ABSTRACT

A system for identifying preferred source nodes and preferred target nodes for nodes of a trunk within a telecommunications network. Each node is connected to an output link of the trunk. A preferred source node for a node is a source node of a restoral route to bypass the output link. A preferred target node for a node is a target node for a restoral route when that node is the source node of the restoral route. The system comprises a read restoration node topology component, a build restoral route table component, a build preferred node table component, and a download component. The read restoration node topology component that reads information describing the topology of the telecommunications network. The build restoral route table component builds a table of restoral routes for a trunk of the telecommunications network. The restoral routes are identified from the information describing the topology of the network. The build preferred node table component builds a preferred source node list and a preferred target node list for each node on the trunk based on the restoral route table. The download component downloads the preferred source node lists and the preferred target node list to the nodes of the trunk.

20 Claims, 9 Drawing Sheets

OTHER PUBLICATIONS

Flanagan et al. "Principles and Technologies for Planning Survivability—A Metropolitan Case Study", IEEE 1989.

M. Wehr "Protection of Synchronous Transmission Networks", Commutation and Transmission, No. 4, 1993.

Coan, et al. "Using Distributed Topology Update and Preplanned Configurations to Achieve Trunk Network Survivability" IEEE Oct. 1991.

| Rec# | Node Pair | Restoral Route | Cost |
|---|---|---|---|
| 1 | A/B | A-F-B | 10 |
| 2 | A/C | A-F-B-C | 17 |
| 3 | A/D | A-F-B-C-D | 23 |
| 4 | A/D | A-B-H-D | 18 |
| 5 | A/E | A-F-G-E | 21 |
| 6 | A/E | A-F-B-C-D-E | 31 |
| 7 | A/E | A-B-F-G-E | 25 |
| 8 | A/E | A-B-H-D-E | 26 |
| 9 | A/E | A-E | 8 |
| 10 | B/C | | |
| 11 | B/D | B-H-D | 14 |
| 12 | B/E | B-H-D-E | 22 |
| 13 | B/E | B-F-G-E | 21 |
| 14 | C/D | | |
| 15 | C/E | | |
| 16 | D/E | | |

Restoral Route Table

FIG. 3

| Rec# | Node Pair | Restoral Route | Cost |
|---|---|---|---|
| 9 | A/E | A-E | 8 |
| 11 | B/D | B-H-D | 14 |
| 4 | A/D | A-B-H-D | 18 |
| 5 | A/E | A-F-G-E | 21 |
| 13 | B/E | B-F-G-E | 21 |
| 12 | B/E | B-H-D-E | 22 |
| 7 | A/E | A-B-F-G-E | 25 |
| 8 | A/E | A-B-H-D-E | 26 |

FIG. 4

Preferred Node Table for Node A port 2

| Source: | A2 | | | | |
|---|---|---|---|---|---|
| preference: | 1 | | | | 501 |
| Target: | B3 | C5 | D7 | E9 | |
| preference: | 3 | 4 | 2 | 1 | |

Preferred Node Table for Node B port 4

| Source: | A2 | B4 | | | |
|---|---|---|---|---|---|
| preference: | 1 | 2 | | | 502 |
| Target: | D7 | E9 | | | |
| preference: | 1 | 2 | | | |

Preferred Node Table for Node C port 6

| Source: | A2 | B4 | C6 | | |
|---|---|---|---|---|---|
| preference: | 2 | 1 | 3 | | 503 |
| Target: | D7 | E9 | | | |
| preference: | 2 | 1 | | | |

Preferred Node Table for Node D port 8

| Source: | A2 | B4 | C6 | D8 | |
|---|---|---|---|---|---|
| preference: | 2 | 1 | 3 | 4 | 504 |
| Target: | E9 | | | | |
| preference: | 1 | | | | |

Preferred Node Table

FIG. 5

METHOD FOR SELECTING PREFERRED NODES FOR DISTRIBUTED NETWORK RESTORATION

RELATED APPLICATIONS

This application is related to U.S. patent application Ser. No. 08/774,599 entitled "METHOD AND SYSTEM OF DISTRIBUTED NETWORK RESTORATION USING PREFERRED ROUTES" and U.S. patent application Ser. No. 08/777,437 entitled "METHOD AND SYSTEM OF DISTRIBUTED NETWORK RESTORATION WITH MULTIPLE FAILURES," which are being filed concurrently and are hereby incorporated by reference.

TECHNICAL FIELD

The present invention relates to communication systems and, in particular, to the restoring of routes after a communications failure.

BACKGROUND OF THE INVENTION

In the telecommunications field, telecommunications carriers (e.g., long distance providers) continually strive to increase the reliability of their telecommunications networks. A telecommunications network consists of a collection of network nodes interconnected via transmission lines. Traffic is transmitted on the network from one endpoint to another endpoint through a current route, which is a network path that specifies the transmission lines that interconnect the endpoints. The main path (i.e., trunk) through the network is referred to as the original route. The network nodes may serve a variety of functions such as amplifying the network traffic for transmission down the next transmission line in the route or establishing an interconnection between two transmission lines connected to the node (i.e., a switch). Unfortunately, the components (e.g., nodes and transmission lines) of the transmission network may occasionally fail. For example, a transmission line that is a buried fiber optic cable may fail as a result of being inadvertently severed by someone digging near the buried cable.

If one or more of the cables fail, massive disruption of services to a large number of network customers could result. Therefore, telecommunications carriers strive to quickly and economically route the network traffic around such failed components by establishing a "restoral" route. A restoral route is a portion of a path between the endpoints that does not include the failed component. The establishing of a restoral route generally involves: (1) detecting that a component on the current route has failed, (2) identifying the location of the failed component, (3) selecting a restoral route to bypass the failed component, and (4) implementing the selected restoral route. The reliability of telecommunication networks depends in large part on the ability to detect such failures and implement the restoral route with minimal impact on network customers.

Telecommunications carriers typically develop "pre-planned" restoral routes that are used when various components fail. The development of such pre-planned restoral routes has several disadvantages. One disadvantage is that the amount of time needed to develop the restoral route for network can increase exponentially with the size of the network. To develop the restoral routes, a telecommunications carrier typically collects large amounts of data relating to the telecommunications network. This data can include the topology of the network, speed of network components, and relative costs of the network components. A network analyst then analyzes the collected data and identifies the pre-planned restoral routes that would result in minimal impact on network customers both in terms of cost and service. The analyst typically needs to identify a pre-planned restoral route for each component that could possibly fail. A second disadvantage is that the pre-planned restoral routes cannot realistically take into consideration every possible combination of component failures. Thus, the pre-planned restoral routes may not be an optimal restoral route given the combination of failures that have occurred. A third disadvantage is that the pre-planned restoral routes cannot adjust to the dynamic nature of the network. The topology of a telecommunication network can be dynamic, that is components can be added, removed, and changed frequently. Therefore, these pre-planned restoral routes may fail because they were developed from outdated data. Consequently, each time the topology changes new pre-planned restoral routes may need to be developed.

When a failure does occur on a telecommunications network, an analyst needs to identify the location of the component that failed and then to select the pre-planned restoral route to implement. To determine where in the network a failure has occurred, a central location often receives various alarms from the network, which are generated in response to the failure. With the aid of numerous algorithms performed to correlate the various alarms based on the network topology, the analyst then matches the alarms to the network topology to identify the location of the failure within the network. After locating the failure, the analyst can then select the appropriate pre-planned restoral route. Locating a failure within the network requires extensive processing, particularly with large networks. Such extensive processing necessarily requires processing time, and therefore increases the delay in selecting and, thus implementing, the restoral route.

SUMMARY OF THE INVENTION

The present invention provides a computer-based system and method for identifying preferred source nodes and preferred target nodes for use when dynamically building restoral routes. Each node of a trunk has a list of the preferred source nodes and preferred target nodes for that node. The preferred source nodes are possible source nodes of restoral routes for bypassing the output link of the node that is part of the trunk. When a node is a source node of a restoral route, the preferred target nodes are target nodes of possible restoral routes to bypass the output link of the source node that is part of the trunk. The system generates the lists of preferred source nodes and preferred target nodes for a node in the trunk by identifying restoral routes that can be used to bypass the output link of the node that is part of the trunk. Each identified restoral route has a source node and a target node. The system then assigns a cost to each identified restoral route. The system selects the source nodes of the identified restoral routes as the preferred source nodes. The system also selects the target nodes of the identified restoral routes that have the node as its source node as the preferred target nodes. The system ranks the preferred source nodes and the preferred target nodes according to the assigned costs of the restoral routes. The system then downloads the list of preferred source nodes and preferred target nodes to the node for use when a restoral route is dynamically built and implemented.

BRIEF DESCRIPTION OF THE DRAWINGS

FIG. 3 illustrates the restoral route table for the trunk.

FIG. 4 illustrates the restoral routes for a link.

FIG. 5 illustrates the preferred node tables for each output port along the trunk.

DETAILED DESCRIPTION OF THE INVENTION

Figure 1:
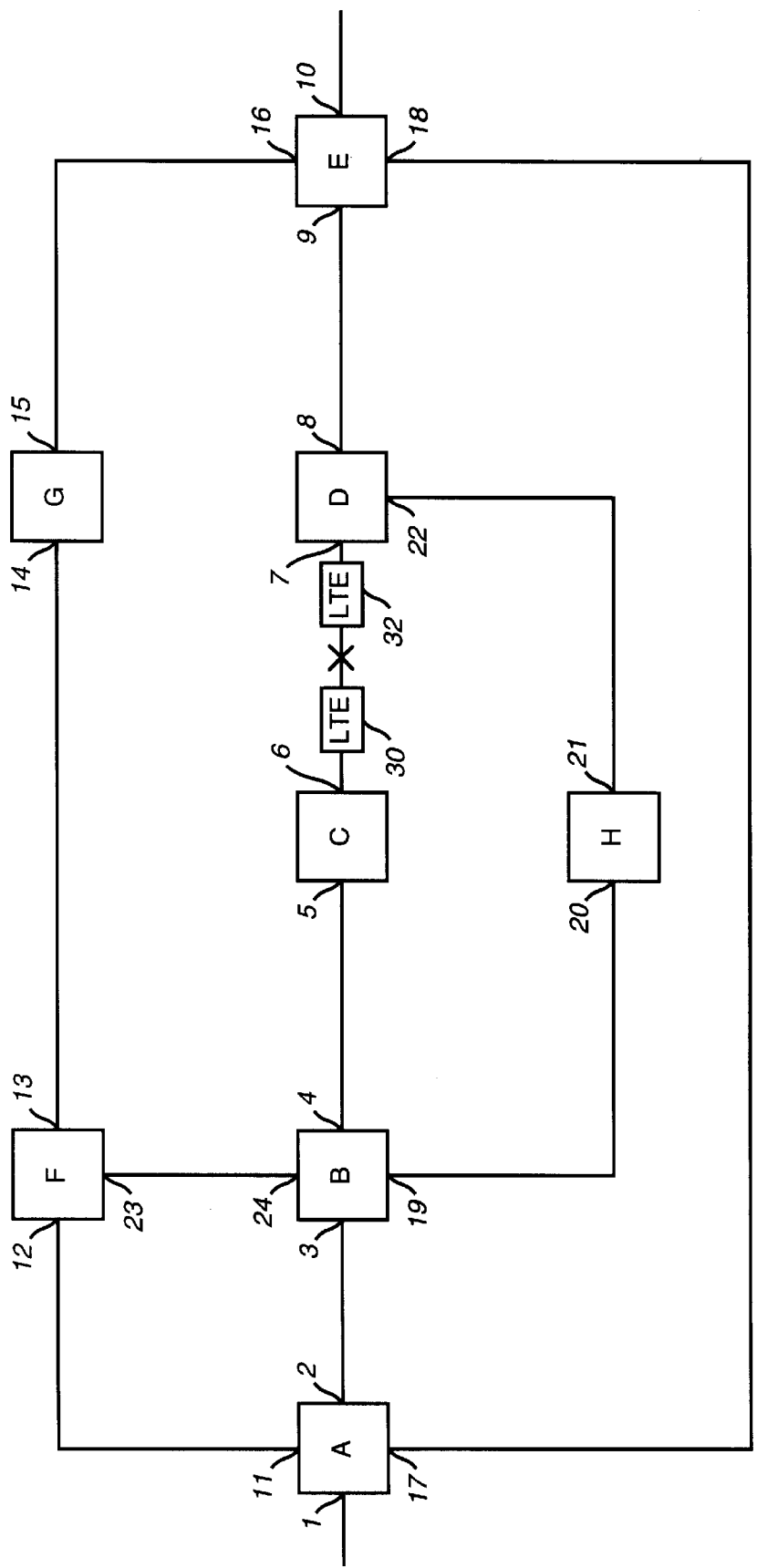
FIG. 1 is a block diagram of an example network topology.

The present invention provides a method and system for generating preferred node tables for use when dynamically building and implementing restoral routes when a network failure is detected on a trunk. When a failure occurs, the "restoration" nodes of the network identify the location of the failure and participate in the building of the restoral route in a distributed manner. A restoration node is a node that can dynamically switch an input (target) transmission line to be connected to different output (source) transmission lines. The transmission lines are connected to the restoration nodes via input and output ports. When a failure is detected, a source node and target node for the restoral route are identified. The source node and target nodes are the end nodes of a restoral route to bypass the failure. The end nodes of the restoral route switch the trunk onto the restoral route.

Each restoration node of an original route (i.e., trunk) has a preferred node table for its output port of the original route. The preferred node table contains a list of preferred source nodes and a list of the preferred target nodes for that output port. The preferred source nodes are nodes that can be used as a source node for a restoral route to bypass a network failure on the link connected to that output port. When a node detects a failure on its output link connected to its output port, the node selects a source node from its list of preferred source nodes for that output port. The node then notifies the source node that it has been selected as the source node. The source node then selects a target node from its list of preferred target nodes for the output port of the original route. The source node then attempts to dynamically build a restoral route to that target node. The preferred target nodes are nodes that can be used as a target node for a restoral route when the node is selected as a source node. The preferred node tables are generated periodically as the topology of the network changes and downloaded to the restoration nodes for use when dynamically building a restoral route.

The system generates the preferred node tables by first gathering information on the topology of the network and identifying each trunk. For each identified trunk, the system identifies possible restoral routes to bypass each link of the trunk and assigns a cost to each restoral route. Then, for each output port of each node on the trunk, the system selects the source nodes of those restoral routes that can be used to bypass the link connected to the output port as the preferred source nodes. The system also selects the target nodes of the identified restoral routes that have as their source nodes the node of the output port to which the link is connected as the preferred target nodes. The preferred source nodes and preferred target nodes are ordered based on the cost assigned to the restoral routes. By ordering the preferred source nodes and preferred target nodes based on cost of the restoral routes, the dynamic building of a restoral route can attempt to build restoral routes starting with the lowest cost restoral route.

When dynamically building a restoral route, a selected source node starts the process of identifying a restoral route to a selected target node. The source node sends messages through its output ports requesting whether the node at the end of the output link can establish a restoral route to the target node. Each node that receives such a message in turn forwards the message through its output ports. Eventually, if a restoral route can be established from the source node to the target node, then the target node will receive that forwarded message. The target node then sends a reply message indicating that a restoral route has been built. Each node on the restoral route, when it receives that message, implements its portion of the restoral route. Eventually, the source node receives the message and implements its portion of the restoral route to complete the establishing of the restoral route. If a node detects that an output link is down or receives a message through an output port indicating that a route cannot be established from that node to the target node through that output port, the node selects another output port and attempts to establish a route to the target node through that other output port. If no route can be established to the target node through any of its output ports, the nodes send an unsuccessful message to the node that sent the request to establish a route to the target node.

Each restoration node in the network can detect a failure that occurs between it and the next restoration node in the current route. When a failure is detected by a restoration node, referred to as an "arbitrator" node, the arbitrator node initiates the process of building and implementing a restoral route. First, the arbitrator node identifies a source node from the preferred node table for the output port of the trunk. The source node will be the first node in the restoral route. Second, the arbitrator node then sends a notification to a preferred source node requesting that it start building a restoral route. When the preferred source node receives the notification, it identifies a preferred target node from the preferred node table for the output port of the trunk. The preferred target node will be the last node in the restoral route. That is, the restoral route will be routed from the source node to the target node to bypass the failed component. The source node selects an output port through which to attempt to establish a restoral route to the target node. The source node then sends a build restoral route message through the selected output port. The build restoral route message identifies the target node of the restoral route. Each restoration node that receives a build restoral route message determines whether a route (direct or indirect) can be established through one of its output ports to the target node. A restoration node determines whether such a route can be established by selecting an output port through which a route may be established to the target node and by sending a build restoral route message through the selected output port. Eventually, a restoration node will send a build restoral route message to the target node, which indicates that a restoral route from the source node to the target node can be established as the route traveled by the message from the source node to the target node. The target node then connects the input port on which it received the build restoral route message to the output port that is on the trunk. The target node then sends an implement restoral route message to the node that sent to it the build restoral route message. When a node receives an implement restoral route message, it connects the input port through which it received the build restoral route message to the output port through which it received the implement restoral route message. The node will then forward the implement restoral route message through the input port through which it received the build restoral route message. Eventually, the source node will receive the implement restoral route message, and it will connect its input port for the trunk to the output port through which it received the implement restoral route message to complete the establishing of the restoral route.

A node that receives a build restoral route message may not be able to establish a restoral route to the target node. The topology of the network may have changed and certain links have been removed or re-routed or a link may have failed. Thus, the restoral route cannot include that node. If a node cannot be part of a restoral route, it notifies the node that sent the build restoral route message that the building of the restoral route through that node was unsuccessful. Each node that receives such a build restoral route unsuccessful message attempts to continue building a restoral route through another of its output ports. If no route to the target node can be built through any of its output ports, the node sends a build restoral route unsuccessful message to the node that sent it the build restoral route message. Eventually, the source node will receive a build restoral route unsuccessful message. The source node then selects another output port through which a restoral route could be built to the target node. If the source node is unsuccessful in building a restoral route to the target node through any of its output links, it selects another preferred target node from the preferred node table of the output port of the trunk and repeats the process of attempting to establish a restoral route to that newly selected target node. Eventually, the source node may find that it cannot be the source node in any restoral route and sends a message to the arbitrator node. The arbitrator node can then select another node from its preferred node table of the output port of the trunk to be the source node of the restoral route and sends a message to that newly selected source node to repeat the process.

Each restoration node also contains a preferred route table for each other restoration node in the network that indicates the output ports of the restoration node, in preferred order, that can be used to build a restoral route to that other restoration node. The output ports of preferred route tables are ordered by cost of the route from the restoration node to the other restoration node via the output ports. By using the preferred route tables when dynamically building a restoral route, the system can attempt to build a restoral route using the lowest cost route from each restoration node to the target node of the restoral route.

FIG. 1 is a block diagram of an example network topology. Nodes A–H represent restoration nodes of a telecommunications network. Typical telecommunication networks consist of many types of nodes (e.g., M-13 sites, digital repeater sites, and switch sites). However, only certain types of nodes are typically used for network restoration. In particular, Digital Cross Connects (DXC), such as DXC 3/3 which switches DS-3 level trunks, are devices that switch transmission lines based on external commands. Thus, nodes that contain DXC devices are considered as restoration nodes. The restoration nodes generally include a computer for controlling the processing of external commands and for switching of the transmission lines. Since only restoration nodes are used to establish a restoral route, only the restoration nodes of the network are shown in FIG. 1. Also, since a connection between any restoration node can include multiple transmission lines and components, the connection is referred to generically as a "link."

Each restoration node has input ports and output ports and can be switched to connect any input port to any output port so that traffic can travel from any input link to any output link connected to the node. Any two nodes may, in general, have multiple links connecting them. That is, nodes A and B could have ports 2' and 3' with another link between them. However, FIG. 1 shows only one link between the nodes. FIG. 1 shows two light wave transmitting equipment (LTE) devices 30 and 32. The "X" between node C and node D indicates that a network failure has occurred between the LTE devices. When a failure occurs a signal (i.e., an alarm) is sent down the link in both directions to node C and node D.

The original route through the network is identified by the sequence of nodes through which data is transmitted from the originating endpoint, node A, to the destination endpoint, node E, in the network. The original route may be, for example, nodes A–B–C–D–E. However, more generally a route would be identified by both node and port within the node (e.g., A2–B4–C6–D8–E10) since, as discussed above, each pair of nodes may be directly connected by multiple links and the port would identify the link that is part of the original route. The ports 1, 3, 5, 7 and 9 are input ports for the original route and ports 2, 4, 6, 8 and 10 are output ports for the original route.

Figure 2:
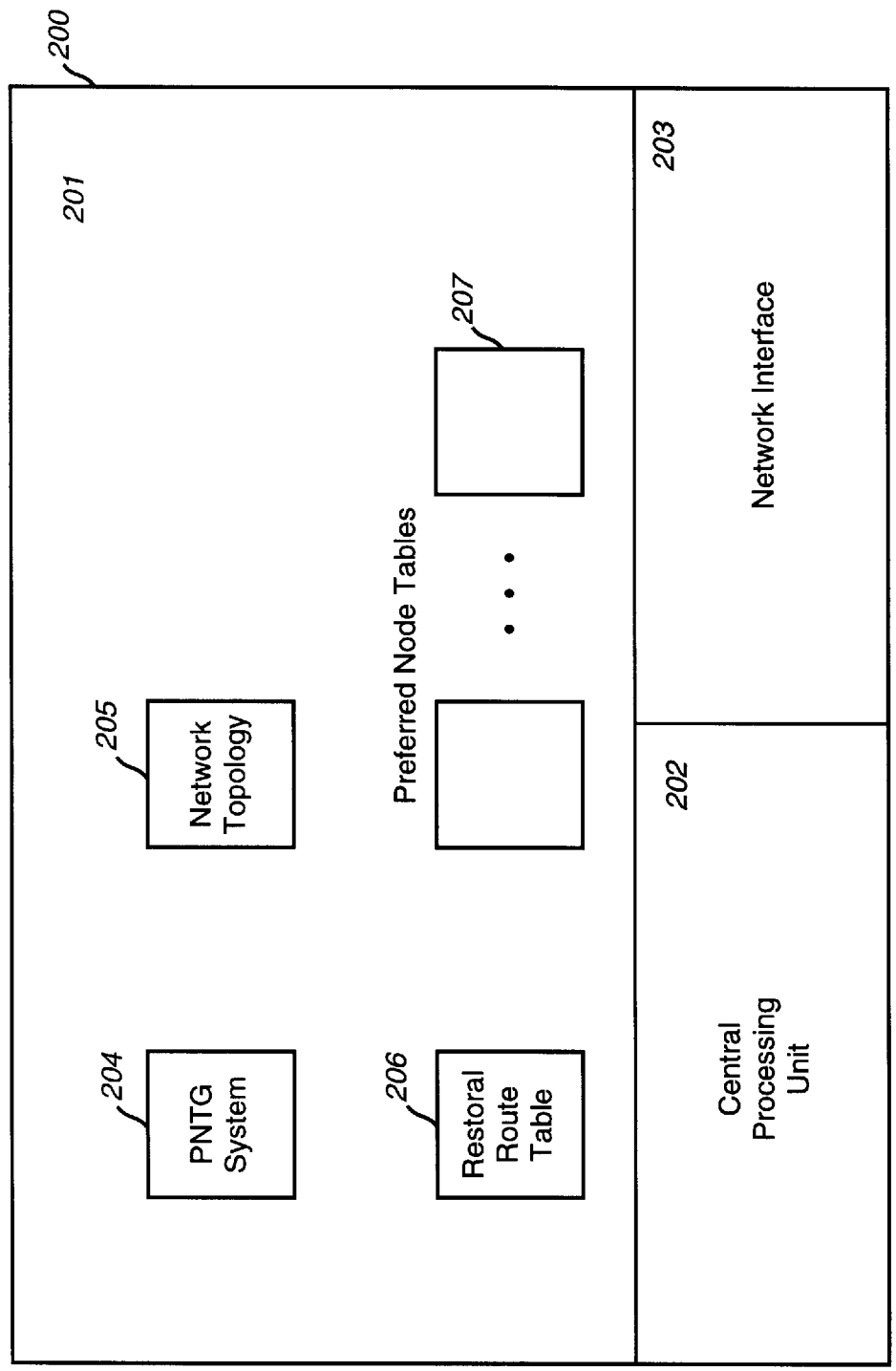
FIG. 2 is a block diagram illustrating the components of the Preferred Node Table Generation ("PNTG") system.

FIG. 2 is a block diagram illustrating the components of an embodiment of the Preferred Node Table Generation ("PNTG") system. The PNTG system executes on a computer system that comprises a memory 201, a central processing unit 202 and a network interface 203. The memory contains the PNTG system 204, the network topology information 205, the restoral route table 206, and the preferred node tables 207. The central processing unit controls the execution of the instructions of the PNTG system to effect the generation of the preferred node tables. Once the preferred node tables are generated, the PNTG system downloads the preferred node tables through the network interface to the various nodes in the network.

The PNTG system of the present invention builds the preferred node tables of a network by first identifying possible restoral routes for a trunk and by assigning a cost to each restoral route. The PNTG system stores these identified restoral routes and their assigned cost into a restoral route table. The PNTG system then for each node on the trunk selects those restoral routes in the restoral route table that can be used to bypass the link connected to the output port of that node. The source nodes for those selected restoral routes are the preferred source nodes for that output port of that node. The target nodes for those selected restoral routes that have that node as its source node are the preferred target nodes. The preferred source nodes and preferred target nodes are ranked in the preferred node table based on the cost assigned to the restoral routes.

FIG. 3 lists a restoral route table for the trunk A–B–C–D–E. To build the restoral route table, the PNTG system selects each possible pair of nodes that are on the trunk. The possible node pairs in this trunk are A/B, A/C, A/D, A/E, B/C, B/D, B/E, C/D, C/E, and D/E. The PNTG system then identifies restoral routes between each node pair that are to be added to the restoral route table. For example, the node pair A/D has three possible restoral routes: A–F–B–C–D, A–F–B–H–D, and A–B–H–D, but only restoral routes A–F–B–C–D and A–B–H–D are added to the restoral route table. The PNTG system applies various criteria to determine whether a restoral route is added to the restoral route table. For example, only routes whose cost is below a certain threshold cost are added to the restoral route table or whose number of links is below a certain threshold number. In this example, route A–F–B–H–D did not meet a criterion and is not added to the restoral route table. The PNTG system calculates the cost of each identified restoral route. The cost can be based on various factors such as distance of the restoral route, number of links and nodes in the route, and type of traffic on the restoral route. The restoral route table of FIG. 3 contains four columns with sixteen records. The columns identify a record number, a node pair, a restoral route, and a cost. The table has no restoral route for node pairs B/C, C/D, C/E, and D/E. In this example, one of the criteria for identifying a restoral route to be added is that the restoral route has no backhaul. Each of these node pairs would require a backhaul of the trunk as part of any restoral route. For example, a possible restoral route for the node pair B/C may be B–H–D–C. However, the link from D–C is a backhaul on the trunk, so it is not identified as a possible restoral route for node pair B/C. Other node pairs would serve as source and target nodes for restoral routes to bypass link B–C. For example, node pair B/D has restoral route B–H–D which can be used to bypass link B–C.

The PNTG system then selects all identified restoral routes that can be used to bypass each link of the trunk. FIG. 4 lists the restoral routes that can be used to bypass the link B–C. The list of restoral routes for link B–C contains each restoral route that has a source node of node A or node B and that has a target node of node D or node E. That is, a restoral route with a source node on one side of link B–C in the trunk and with a target node on the other side of link B–C in the trunk is added to the list of restoral routes for link B–C. For example, record 4 of the restoral route table of FIG. 3 corresponds to restoral route A–B–H–D and is selected because nodes A and D are on opposite sides of link B–C in the trunk. The PNTG system ranks the restoral routes for each link according to the cost assigned to the restoral route.

After the PNTG system generates the list of restoral routes for a link, the PNTG system scans the list to identify the source nodes of the restoral routes. The restoral routes for link B–C have two source nodes: node A and node B. The PNTG system stores an indication of nodes A and B as preferred source nodes in the preferred node table for the output port of node B that is connected to link B–C. The PNTG system also stores an indication of a ranking of the costs of the restoral routes for which nodes A and B are source nodes. Since node A is the source node for the lowest cost restoral route A–E, node A is ranked before node B. The ranking can be indicated by the ordering of the nodes in the preferred node table or by a numeric indication of the rank. To identify the preferred target nodes, the PNTG system determines which restoral routes have node B as their source node and identifies the target nodes of those determined restoral routes as the preferred target nodes for node B. Three restoral routes (i.e., B–H–D, B–F–G–E, and B–H–D–E) of the restoral routes for link B–C have node B as their source node. Thus, the PNTG system adds the target nodes, nodes D and E, of those restoral routes as preferred target nodes. Also, since node D is the target node of a determined restoral route (i.e., B–H–D) with a cost that is less than the cost of the determined restoral routes (i.e., B–F–G–E and B–H–D–E) in which node E is the target node, the PNTG system ranks node D before node E.

FIG. 5 illustrates the preferred node tables for each output port of the trunk A–B–C–D–E. Table 502 is the preferred node table for port 4 of node B. The preferred source nodes for port 4 of node B are node A and B and the preferred target nodes are nodes D and E. The number in the preference row indicates the rank of the nodes. For example, the preferred target nodes for port 2 of node A as shown in table 501 are B, C, D, and E and the ordering of their ranking is NODE E, D, B, and C.

Figure 6:
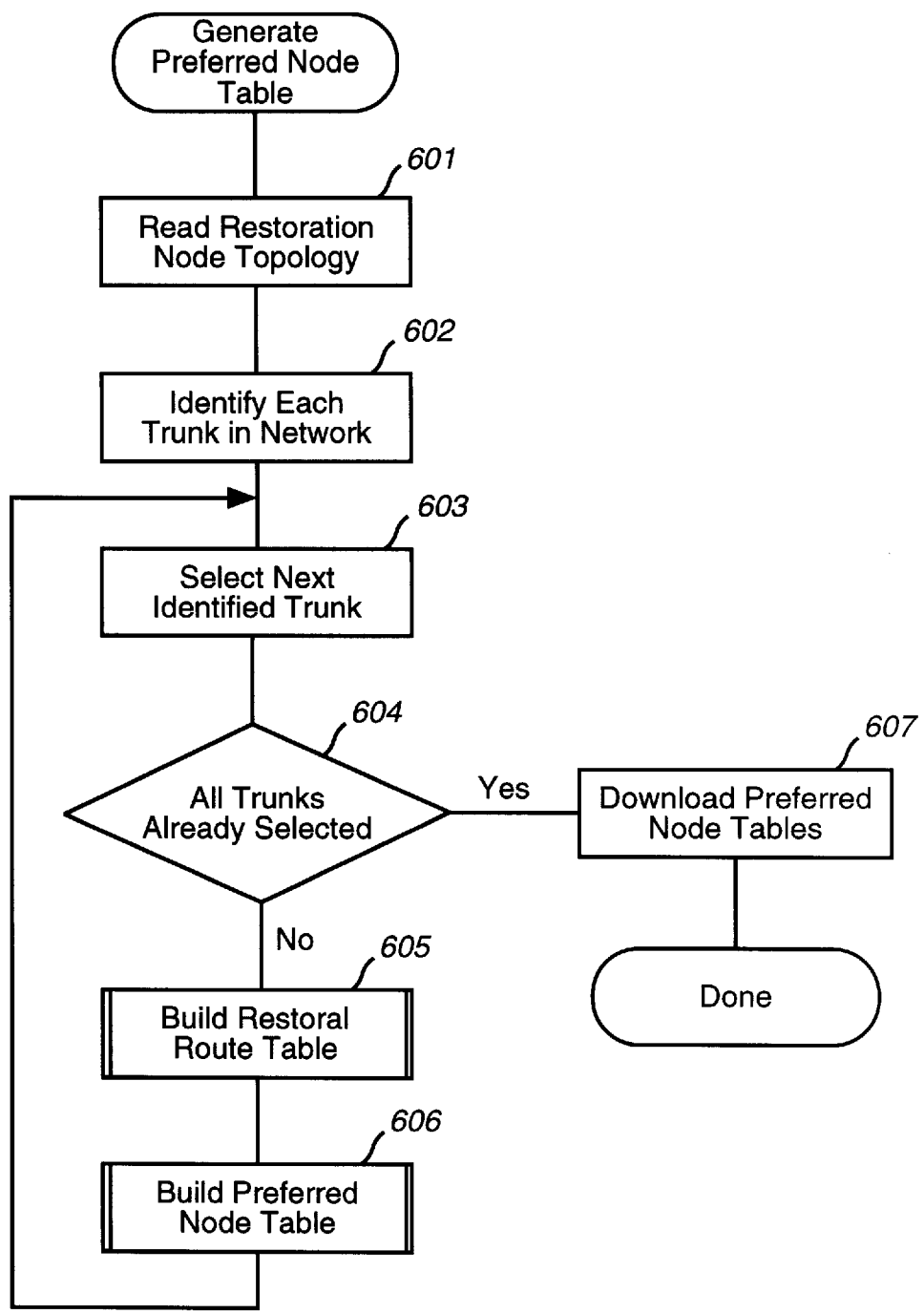
FIG. 6 is a flow diagram of an implementation of the generate preferred node table routine.

FIG. 6 is a flow diagram of an implementation of the generate preferred node table routine. The generated preferred node table routine is an implementation of the PNTG system. This routine retrieves information describing the topology of a network, identifies each trunk of the network, and builds a preferred node table for each port of node that is on a trunk. This routine then downloads the preferred node tables to the nodes for use when dynamically building a restoral route. In step 601, the routine reads the topology of the restoration nodes of the network from a database describing the topology. In step 602, the routine identifies each trunk in the network. In steps 603–606, the routine loops building the preferred node tables for each node on each trunk. In step 603, the routine selects the next identified trunk starting with the first. In step 604, if all the trunks have already been selected, then all the preferred node tables have been built and the routine continues at step 607, else the routine continues at step 605. In step 605, the routine invokes the build restoral route table routine passing an indication of the selected trunk. The build restoral route routine builds the restoral route table that identifies each restoral route for each pair of nodes on the selected trunk that satisfy the various criteria. In step 606, the routine invokes the build preferred node table routine to build the preferred node tables for each node on the selected trunk using the restoral route table. The routine then loops to step 603 to select the next identified trunk. In step 607, the routine downloads the preferred node tables to the nodes within the network and the processing is complete.

Figure 7:
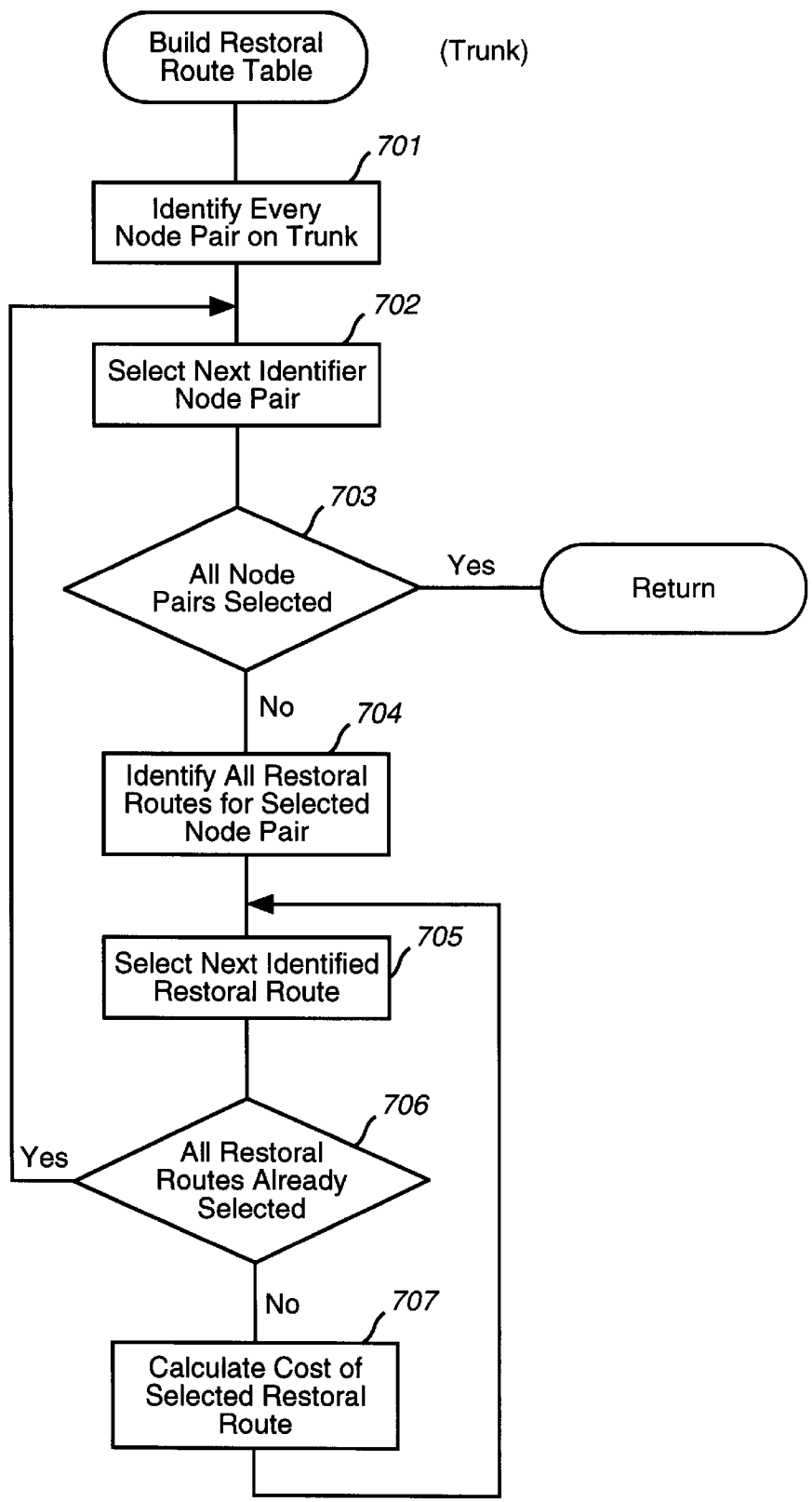
FIG. 7 is a flow diagram of an implementation of the build restoral route table routine.

FIG. 7 is a flow diagram of an implementation of the build restoral route table routine. This routine is passed the indication of a trunk and builds the restoral route table for that trunk. The routine identifies restoral routes for each pair of nodes on the trunk and calculates the cost of each restoral route. In step 701, the routine identifies every node pair on the passed trunk. In steps 702–707, the routine loops identifying the restoral routes for each identified node pair and calculating the cost of each restoral route. In step 702, the routine selects the next identified node pair starting with the first. In step 703, if all the identified node pairs have already been selected, then the routine returns, else the routine continues at step 704. In step 704, the routine identifies those routes for the selected node pair that pass the various criteria. One criteria is that the route needs to bypass a link of the trunk. For example, the routes are identified for node pair A/D are A–F–B–C–D and A–B–H–D. The route A–F–B–C–D bypasses link A–B and the route A–B–H–D bypasses links B–C AND C–D. The route A–B–C–D is not identified because it does not bypass any link. The route A–E–D is also not identified because it includes backhaul link E–D. In steps 705–707, the routine loops calculating the cost for each identified restoral route. In step 704, the routine selects the next identified restoral route. In step 706, if all the identified restoral routes have already been selected, then the routine loops to step 702 to select the next identified node pair, else the routine continues at step 707. In step 707, the routine calculates the cost of the selected restoral route. Many different techniques can be used to calculated the cost of a restoral route. Common factors for determining costs include the network resources of the restoral route, the capacity of the restoral route, the distance of the restoral route, the number of links and nodes in the restoral route, and the type of traffic carried by the restoral route. After calculating the cost of the selected restoral route, the routine loops to step 705 to select the next identified restoral route.

Figure 8:
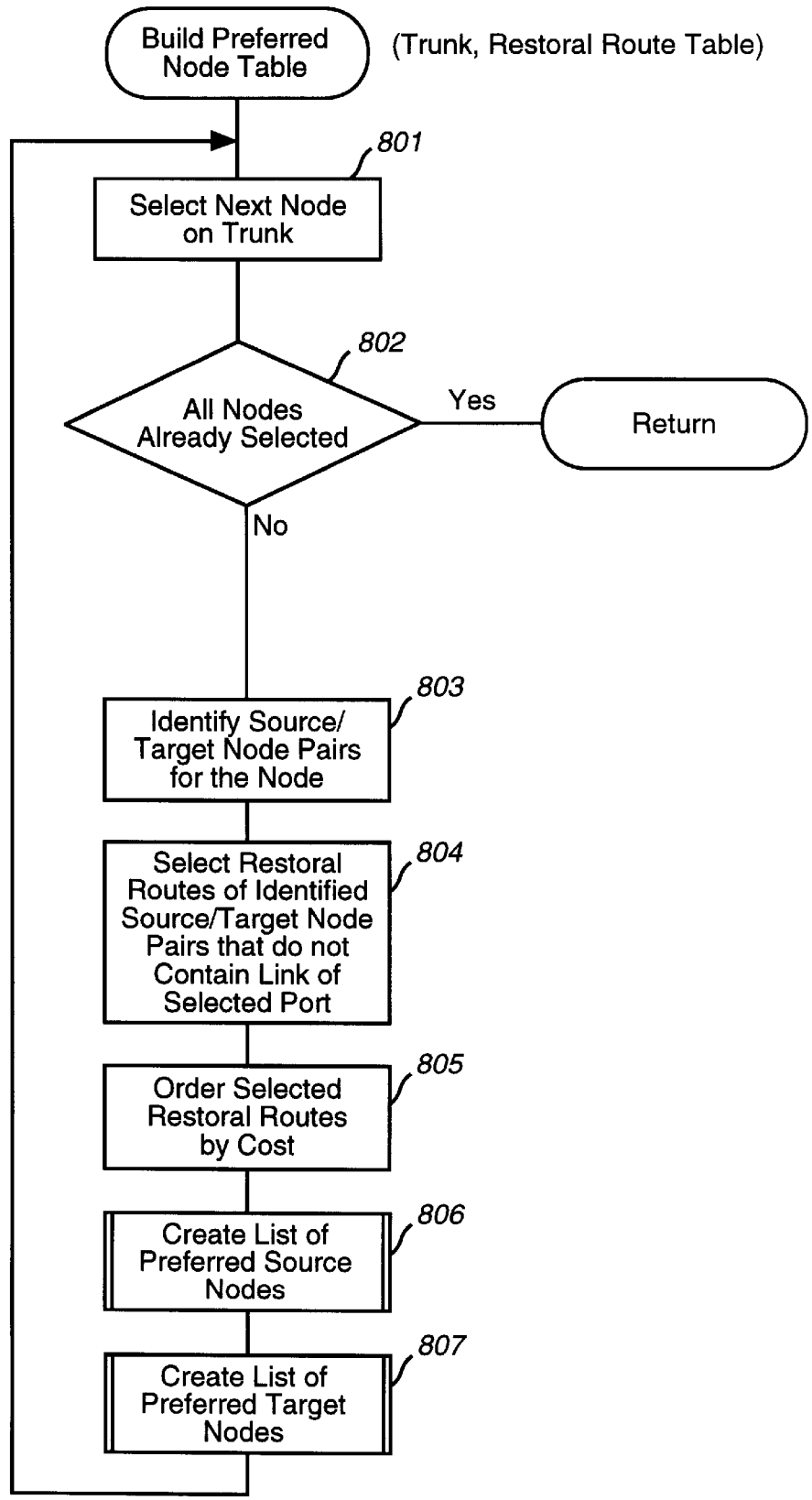
FIG. 8 is a flow diagram of an implementation of the build preferred node table routine.

FIG. 8 is a flow diagram of the build preferred node table routine. The build preferred node table routine is passed an indication of a trunk and the restoral route table for that trunk. The routine builds a preferred node table for the output port of each node of the passed trunk. In steps 801–809, the routine loops selecting each node of the passed trunk and creating the preferred node table for the output port of the selected node. In step 801, the routine selects the next node on the trunk. In step 802, if all the nodes have already been selected, then the routine returns, else the routine continues at step 803. In steps 803–807, the routine builds the preferred node table for the output port of the selected node. In step 803, the routine identifies each pair of nodes that can serve as source and target nodes for a restoral route to bypass the output link of the selected node. For example, the node pairs that can serve as source and target nodes of a restoral route to bypass link B–C are A/C, A/D, A/E, B/C, B/D, and B/E. In step 804, the routine selects restoral routes from the restoral route table for the identified source/target node pairs that do not contain the output link of the selected node. That is, only restoral routes that can be used to bypass the output link are selected. For example, restoral route A–F–B–C–D is not selected because it includes link B–C. In step 805, the routine orders the selected restoral routes by their cost. In step 806, the routine invokes a routine to create a list of the preferred source nodes for the selected node. In step 807, the routine invokes a routine to create a list of the preferred target nodes for the selected node. The routine then loops to step 801 to select the next node in the passed trunk.

Figure 9:
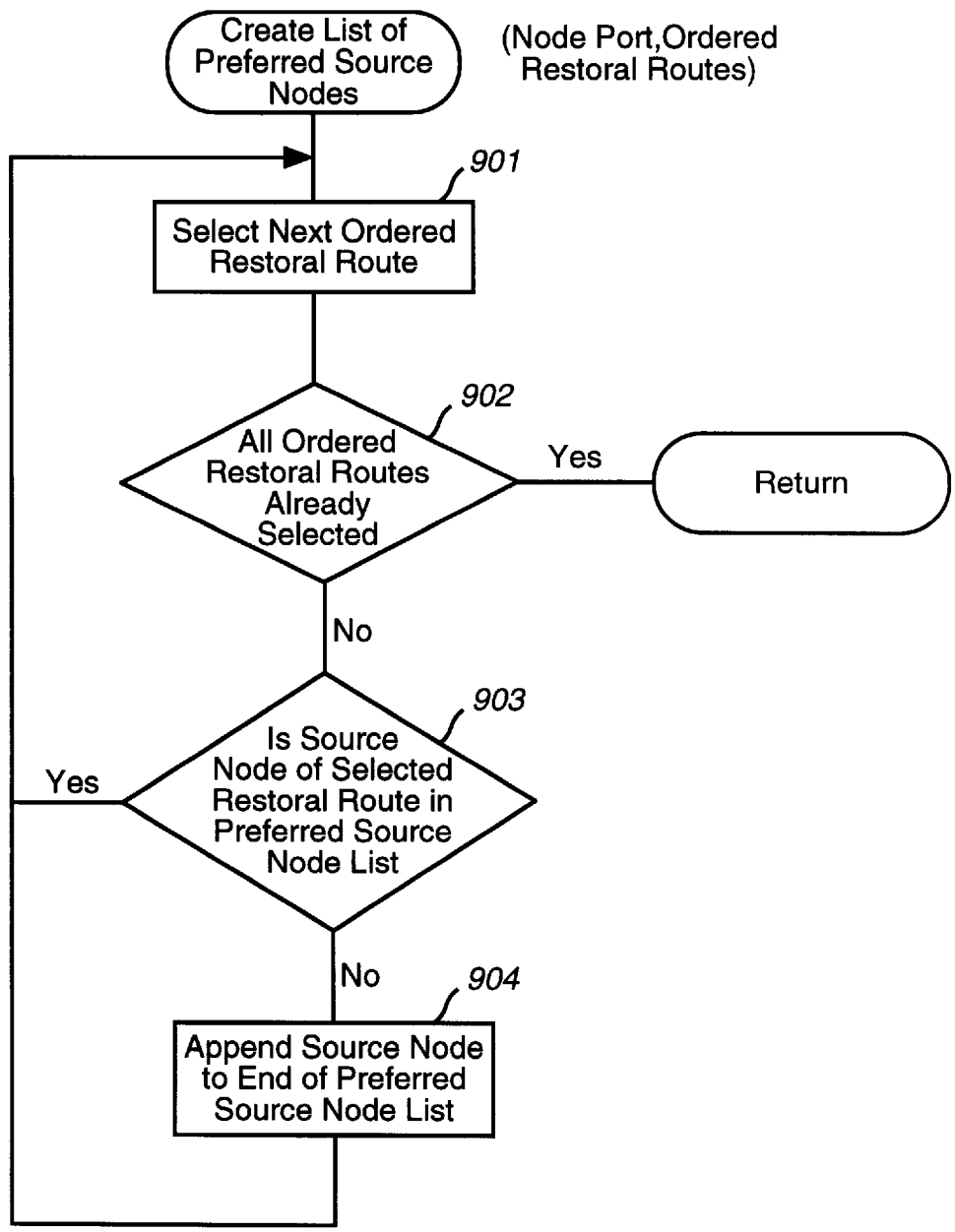
FIG. 9 is a flow diagram of an implementation of a routine to create a list of preferred source nodes.

FIG. 9 is a flow diagram of a routine to create a list of preferred source nodes. The routine is passed an ordered list of restoral routes for a node. The routine selects those nodes that are the source node of at least one of the restoral routes as preferred source nodes. In step 901, the routine selects the next ordered restoral route starting with the first. In step 902, if all the restoral routes have already been selected, then the routine returns, else the routine continues at step 903. In step 903, if the source node of the selected restoral route is already in the list of preferred source nodes for the node, then the routine loops to step 901 to select the next ordered restoral route, else the routine continues at step 904. In step 904, the routine appends a source node to the end of the preferred source node list and loops to step 901 to select the next ordered restoral route. The order in which the source nodes are appended to the list indicate their ranking. Alternatively, a preference number indicating its ranking can be associated with each preferred source node.

Figure 10:
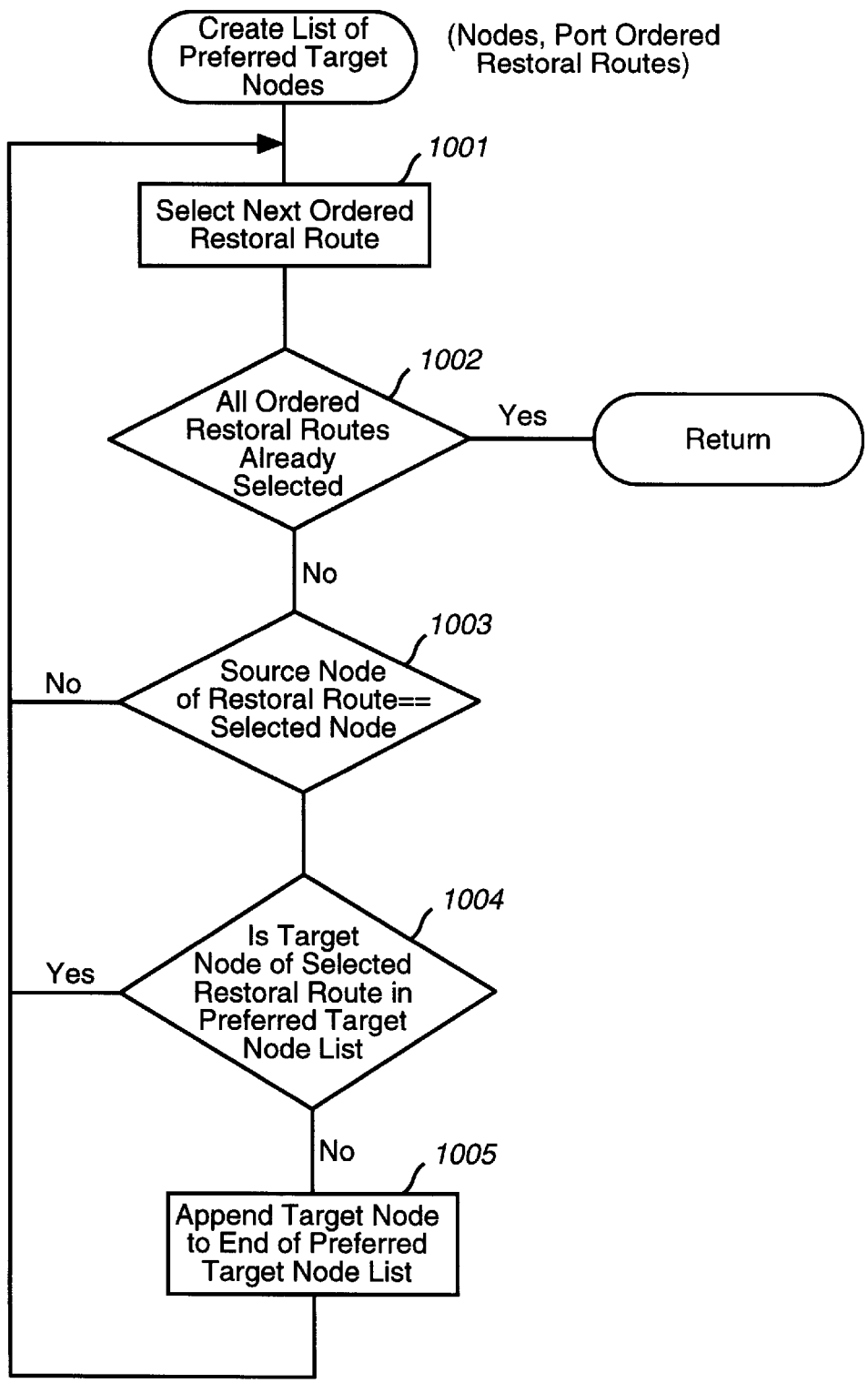
FIG. 10 is a flow diagram of an implementation of the routine to create a list of preferred target nodes.

FIG. 10 is a flow diagram of the routine to create a list of preferred target nodes. This routine is passed an ordered list of restoral route for a node. The routine selects each restoral route that starts at that node and identifies the target nodes of the selected restoral routes as preferred target nodes. In step 1001, the routine selects the next ordered restoral route starting with the first. In step 1002, if all the ordered restoral routes have been selected, then the routine returns, else the routine continues at step 1003. In step 1003, if the source node of the selected restoral route is the same as the node, then the routine continues at step 1004, else the routine loops to select the next ordered restoral route. In step 1004, if the target node of the selected restoral route is already in the preferred node list, then the routine loops to step 1001 to select the next ordered restoral route, else the routine continues at step 1005. In step 1005, the routine appends the target node to the end of the preferred target node list and loops to step 1001 to select the next ordered restoral route.

Although the present invention has been described in terms of an embodiment, it is not intended that the invention be limited to this embodiment. Modifications within the spirit of the invention will be apparent to those skilled in the art. The scope of the present invention is defined by the claims that follow.

I claim:

1. A method in a computer system for identifying a preferred source node and a preferred target node of a node, the node having an output link, the preferred source node being a source node of a restoral route to bypass the output link of the node, the preferred target node being a target node of a restoral route when the node is a source node of a restoral route to bypass the output link of the node, the method comprising:

identifying restoral routes to bypass the output link of the node, each restoral route having a source node and a target node;

assigning a cost to each identified restoral route;

selecting as the preferred source node the source node of the identified restoral route with the assigned cost that is lowest;

selecting as the preferred target node the target node of the identified restoral route with the assigned cost that is lowest and that has the node as its source node; and downloading an indication of the selected source node and the selected target node to the node for use as the preferred source node and the preferred target node for the node.

2. The method of claim 1 wherein the selecting as the preferred source node includes generating a list of the source nodes of the identified restoral routes, wherein the list is ordered by the assigned cost of the identified restoral route.

3. The method of claim 1 wherein the selecting as the preferred target node includes generating a list of the target nodes of the identified restoral routes that have the node as their source node, wherein the list is ordered by the assigned cost of the identified restoral route.

4. The method of claim 1 wherein the identifying and selecting are performed for each node in a trunk of a network.

5. The method of claim 1 wherein the identifying includes generating restoral routes for each pair of nodes in a trunk of a network, the generated restoral routes for a pair of nodes having the nodes of the pair as the end nodes of the restoral route.

6. The method of claim 5 wherein the identified restoral routes to bypass the output link of the node includes those generated restoral routes that do not include the output link and with a source node that is not after the node in the trunk and with a target node that is after the node in the trunk.

7. A method in a computer system for generating a preferred source node list for a node in a network, the node having an output link, the preferred source node list identifying source nodes of restoral routes to bypass the output link, the method comprising:

identifying restoral routes that bypass the output link of the node, each restoral route having a source node;

adding to the preferred source node list for the node each source node of an identified restoral route; and downloading the preferred source node list to the node.

8. The method of claim 7, including assigning a cost to each identified restoral route and ordering the preferred source node list based on the assigned costs for the restoral routes of the source nodes.

9. The method of claim 7 wherein the network has a trunk and wherein a preferred source node list is identified for each node of the trunk.

10. The method of claim 7 wherein each identified restoral route does not include any backhaul on a trunk of the network.

11. The method of claim 7 wherein the identifying includes generating restoral routes for each pair of nodes in a trunk of the network, the generated restoral routes for a pair of nodes having the nodes of the pair as the end nodes of the restoral route.

12. The method of claim 11 wherein the identified restoral routes to bypass the output link of the node include those generated restoral routes that do not include the output link and with a source node that is not after the node in the trunk and with a target node that is after the node in the trunk.

13. A method in a computer system for generating a preferred target node list for a node in a network, the node having an output link, the preferred target node list identifying target nodes of restoral routes that start at the node and bypass the output link, the method comprising:

identifying restoral routes that bypass the output link of the node and that has the node as its source node, each restoral route having a target node;

adding to the preferred target node list for the node each target node of an identified restoral route; and downloading the preferred target node list to the node.

14. The method of claim 13, including assigning a cost to each identified restoral route and ordering the preferred target node list based on the assigned costs for the restoral routes of the target nodes.

15. The method of claim 13 wherein the network has a trunk and wherein a preferred target node list is identified for each node of the trunk.

16. The method of claim 15 wherein each identified restoral route does not include any backhaul on the original route.

17. The method of claim 13 wherein the identifying includes generating restoral routes for each pair of nodes in a trunk of the network, the generated restoral routes for a pair of nodes having the nodes of the pair as the end nodes of the restoral route.

18. The method of claim 17 wherein the identified restoral routes to bypass the output link of the node include those generated restoral routes that do not include the output link and with a source node that is not after the node in the trunk and with a target node that is after the node in the trunk.

19. A computer system for identifying preferred source nodes and preferred target nodes for nodes of a trunk within a telecommunications network, each node being connected to an output link of the trunk, a preferred source node for a node being a source node of a restoral route to bypass the output link, a preferred target node for a node being a target node for a restoral route when the node is the source node of the restoral route, comprising:

a read restoration node topology component that reads information describing the topology of the telecommunications network;

a build restoral route table component that builds a table of restoral routes for a trunk of the telecommunications network, the restoral routes being identified from the information describing the topology of the network;

a build preferred node table component that builds a preferred source node list and a preferred target node list for each node of the trunk based on the restoral route table; and a download component that downloads the preferred source node lists and the preferred target node lists to the nodes of the trunk.

20. The computer system of claim 19 wherein the build preferred node table component ranks the nodes in the preferred source node list and the preferred target node list according to cost of the restoral routes.

* * * * *